(12) United States Patent
Mitschele

(10) Patent No.: US 7,874,482 B2
(45) Date of Patent: Jan. 25, 2011

(54) PARKING METER

(76) Inventor: Frederick L. Mitschele, 1320 West 15th Avenue, Vancouver, BC (CA) V6H 1S3

( * ) Notice: Subject to any disclaimer, the term of this patent is extended or adjusted under 35 U.S.C. 154(b) by 710 days.

(21) Appl. No.: 11/747,908

(22) Filed: May 13, 2007

(65) Prior Publication Data

US 2008/0277468 A1    Nov. 13, 2008

(51) Int. Cl.
*G06K 5/00* (2006.01)
*G07B 15/02* (2006.01)
(52) U.S. Cl. ...................... 235/384; 235/380
(58) Field of Classification Search ............... 235/376, 235/377, 379, 380, 384; 705/13, 418
See application file for complete search history.

(56) References Cited

U.S. PATENT DOCUMENTS 5,648,906 A * 7/1997 Amirpanahi ............... 705/418
5,940,481 A * 8/1999 Zeitman ..................... 705/13

\* cited by examiner

*Primary Examiner*—Thien M Le

(57) ABSTRACT

A parking system using parking meters which accept payment by credit card or smart cards. The user can start the parking payment period by swiping a credit card in the reader. A fixed pre-payment is charged to the card. The payment period is terminated when the same card is swiped a second time. The pre-paid charge is cancelled and the card is charged only for the actual elapsed time.

4 Claims, 5 Drawing Sheets

PARKING METER

TECHNICAL FIELD

The present invention relates to parking meters and, more particularly, parking meters which utilize smart cards or credit cards for payment.

BACKGROUND

Parking meters are used to receive payment for the use of parking spaces on municipal streets and in parking lots. They are used to regulate a limited number of parking spaces, generally from one to four, and are situated adjacent the parking spaces. This is as opposed to a central collection system where a single machine is used to receive payment and issue tickets for a large number of spaces which may not be adjacent to the machine. Parking meters typically display the time which has been paid for so that users and parking enforcement officers can determine if payment is required or a parking violation has occurred.

Traditionally parking meters have only accepted coins for payment, while centralized parking machines have accepted coins, bills or credit cards. Coin operated meters are undesirable due to vandalism and theft, and the cost of collecting the coins. Also drivers often do not have the proper change. Various attempts have been made to incorporate payment by cards into parking meters. International patent application no. PCT/US97/02784, publication no. WO 97/30421 of POM, Inc. describes an electronic parking meter system that charges a fixed amount of time to a smart card upon parking. The card is reinserted when the motorist is leaving the space and a refund of any remaining time is provided. U.S. Pat. No. 4,861,971 Chan describes an electronic parking meter system that uses a pre-paid account card to charge a maximum chargeable amount to the card when the meter is started. Such systems have not received wide acceptance due to difficulties in implementing such pre-paid parking cards.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The invention provides a method of operating a pay parking system comprising a plurality of parking spaces, a plurality of parking meters, each parking meter comprising a credit card reader, a timer and a processor coupled to the credit card reader, the method comprising: a) commencing the timing of a parking payment period by the credit card reader reading a credit card; b) authorizing a fixed pre-payment amount to the credit card; c) timing the parking period; d) ceasing the timing of the parking period upon reading the credit card a second time; e) cancelling the fixed pre-payment amount charge; f) calculating the charge amount for the time elapsed between steps a) and d); g) charging the credit card the amount calculated in step f).

The invention further provides a method of operating a pay parking system comprising a plurality of parking spaces, a plurality of parking meters, each parking meter comprising a smart card reader, wireless communication means for communicating with a central server and a processor coupled to said smart card reader and the wireless communication means, and a plurality of smart cards each comprising data storage means for storing a unique identifier and a variable credit balance, the method comprising: a) a user authorizing a credit card payment to the central server in association with a unique identifier of a first smart card; b) authorizing a fixed pre-payment amount to the credit card; c) the user causing the first smart card to be read at one of the meters; d) the meter communicating with the central server; e) the central server communicating to the meter the amount of the credit card payment; and f) the smart card reader adding the amount of the credit card payment to the credit balance on the first smart card.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
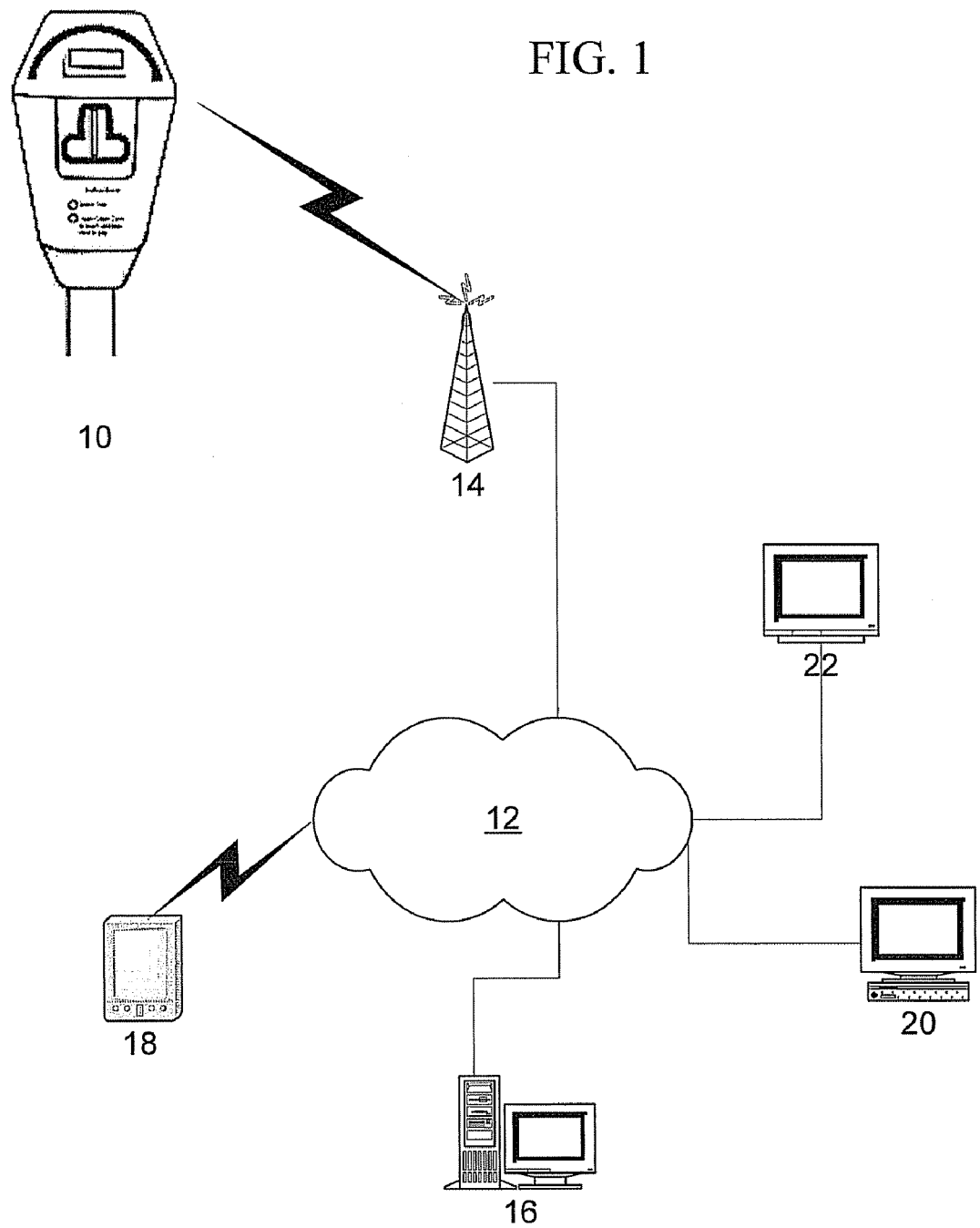
FIG. 1 is a schematic diagram of a wireless parking meter system using card payment.

Referring to FIG. 1, a plurality of parking meters 10 are wirelessly connected to a computer network such as the internet 12, such as by wireless network antenna 14. Also connected to the internet are the system server 16, cellular telephones 18, a plurality of user terminals 20 and electronic billboards 22.

Figure 2:
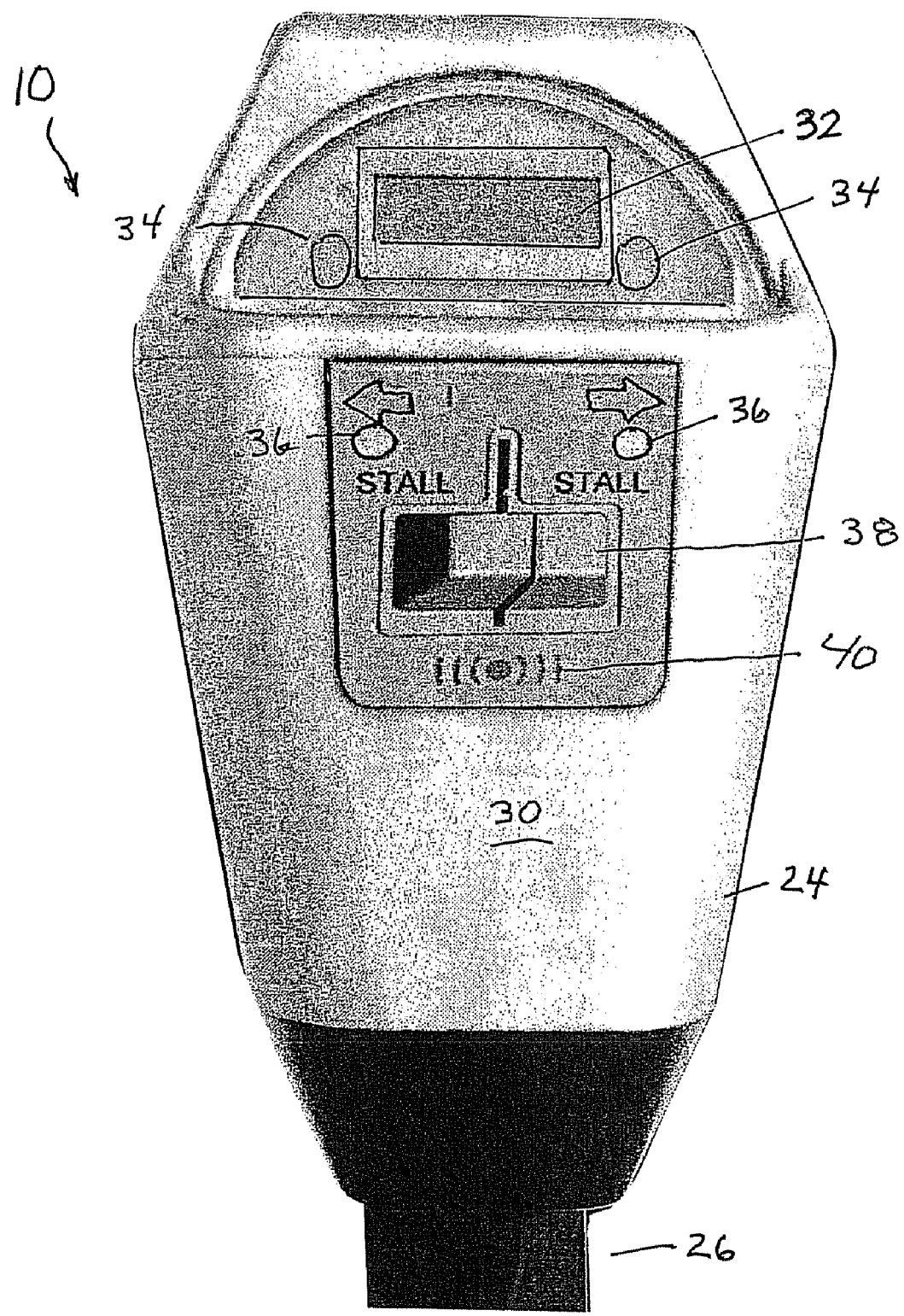
FIG. 2 is a front elevation view of a first embodiment of a parking meter used in the invention.
Figure 3:
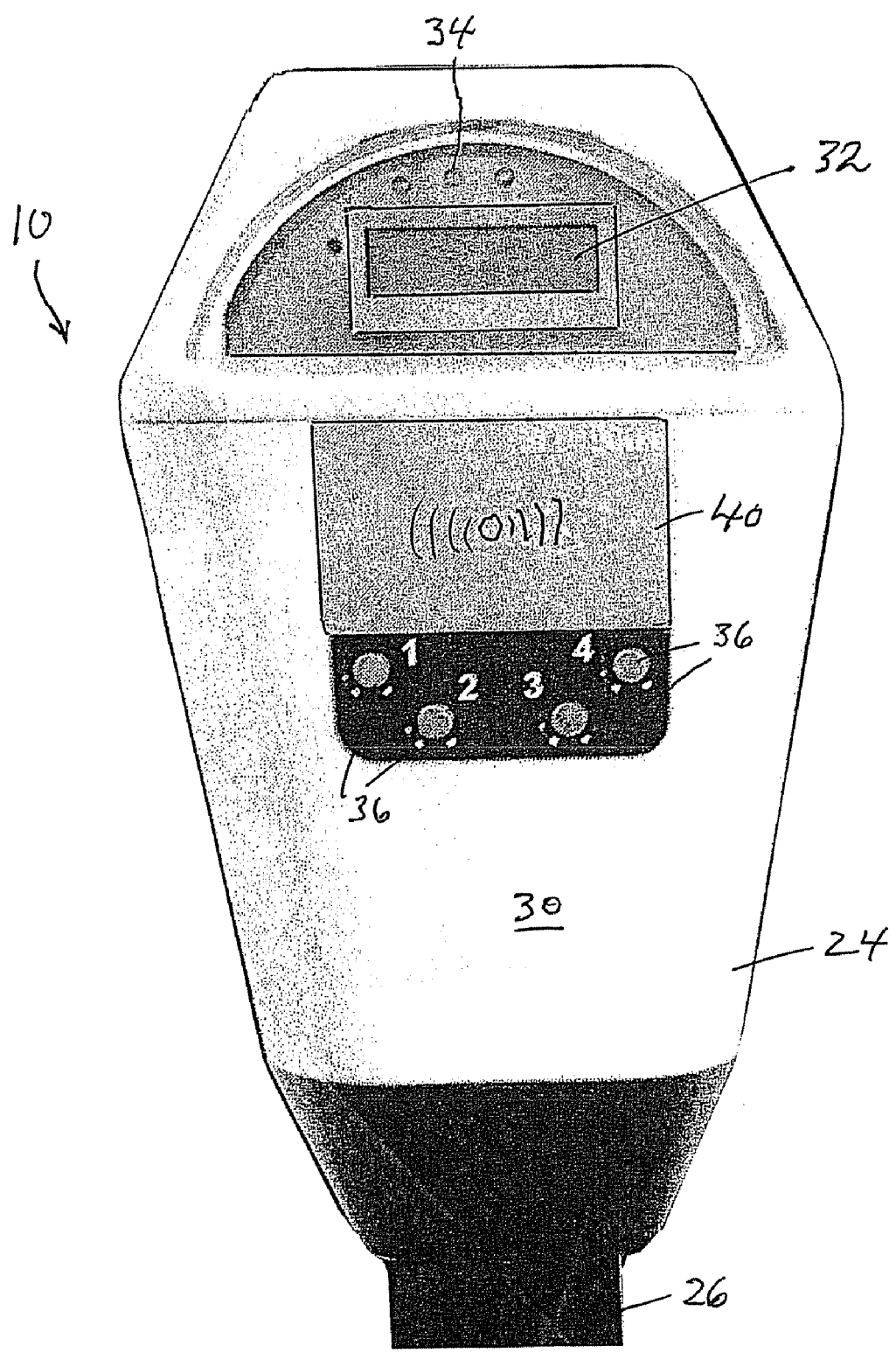
FIG. 3 is a front elevation view of a second embodiment of a parking meter used in the invention.
Figure 4:
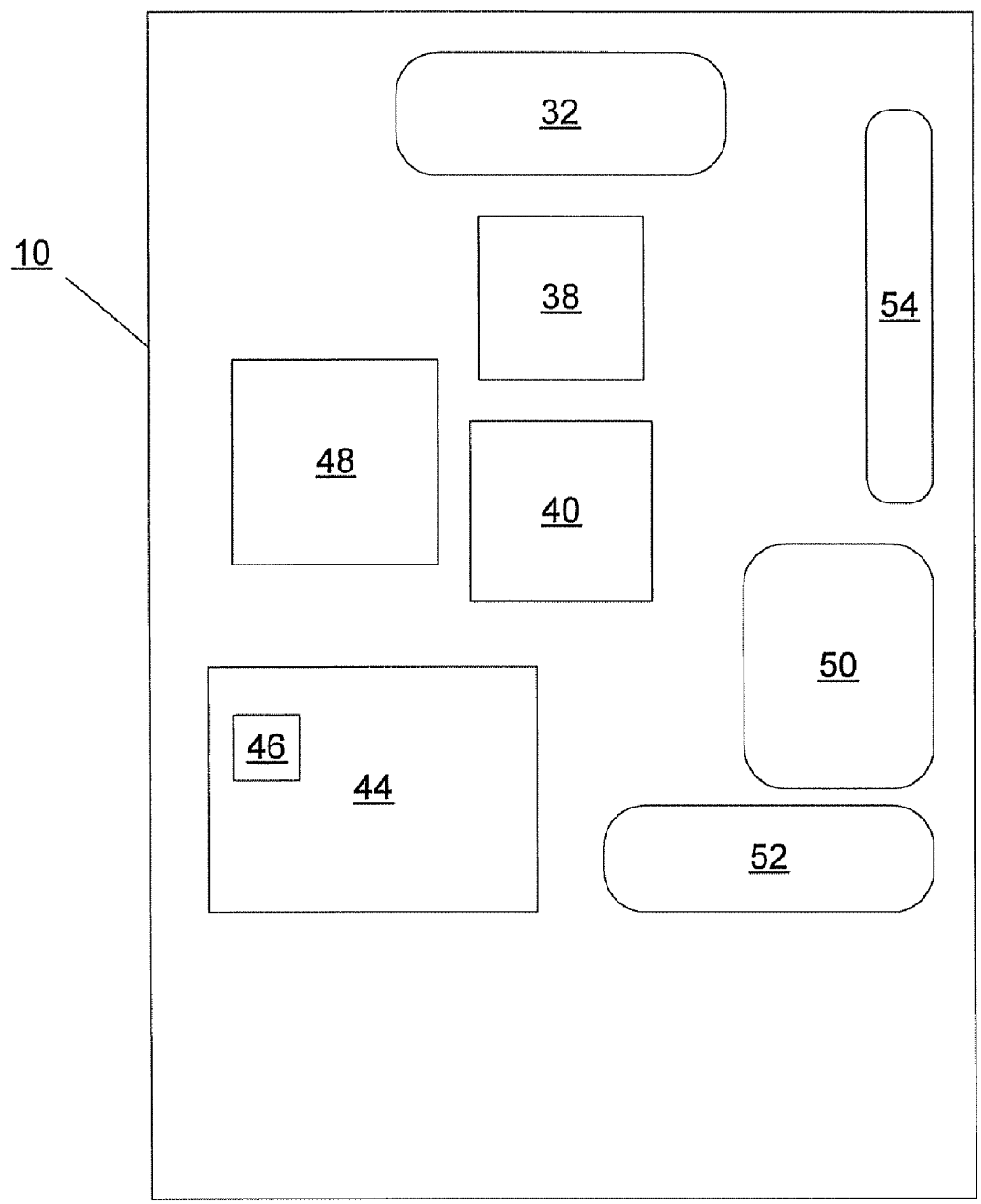
FIG. 4 is a schematic diagram of a wireless parking meter used in the invention.

The parking meter 10, shown in FIG. 2, has a head 24 mounted on pole 26. Head 24 has rigid weatherproof housing 30, preferably a high strength alloy casting finished with a baked varnish or spray coating. It has an LED display 32, violation indicators 34 and stall selection buttons 36. A magnetic stripe card reader 38 is provided as well as a wireless smart card reader 40. The embodiment shown in FIG. 2 handles two parking stalls. The embodiment shown in FIG. 3 handles 4 adjacent stalls, and only provides a wireless smart card reader 40.

Meter 10 has a microprocessor 44 which controls the parking meter functions, a timer 46 coupled with and controlled by the microprocessor, a payment acceptance unit 48 coupling with the microprocessor, and wireless communications linkage hardware 50 coupled with and controlled by the microprocessor in the form of GPRS/GSM modem or WLan connectivity. Power supply 52 is preferably a closed, maintenance free 4.8 volt to 6.8 volt battery with a 4 month charge period and a service life of 5 years. Other power supplies such as in-ground supply or solar power are also useful. Solar panels (not shown) may be provided to charge battery 52. To maintain low power consumption the quiescent current is preferably kept below 15 micro-amperes and the dynamic current below 120 milli-amperes. The meter also has antenna 54 to receive a signal from vehicle detector 56 which is also coupled to microprocessor 44. Vehicle detector 56 (FIG. 5) is preferably an in-ground sensor as disclosed in the present applicant's International application no. PCT/CA2006/001372, publication no. WO 2007/025364 and pending U.S. provisional patent application No. 60/892,234, which are incorporated herein by reference.

Such in-ground vehicle sensors 56 may have a number of functionalities enclosed in a housing. The vehicle sensing element of such sensors may be of the type manufactured by Honeywell, Nu-metrics, magnetic or proximity sensors. They may incorporate a microcontroller or microprocessor, a clock to provide the date and time and a timer coupled with and controlled by the microprocessor, a memory communicating with the microprocessor, as well as the vehicle sensing circuit and wireless communication means all coupled to the microprocessor. A solar panel may be provided to provide power and/or charge a battery and a GPS unit may be provided to provide the geographic location of the device. The memory on the device will also store the parking regulations for that location and store any violations. In-ground sensor 56 may be simply a vehicle detector without camera, or it may also include one or two digital cameras for taking pictures of vehicles in the stalls and may also include an infrared light for taking nighttime photos.

Figure 5:
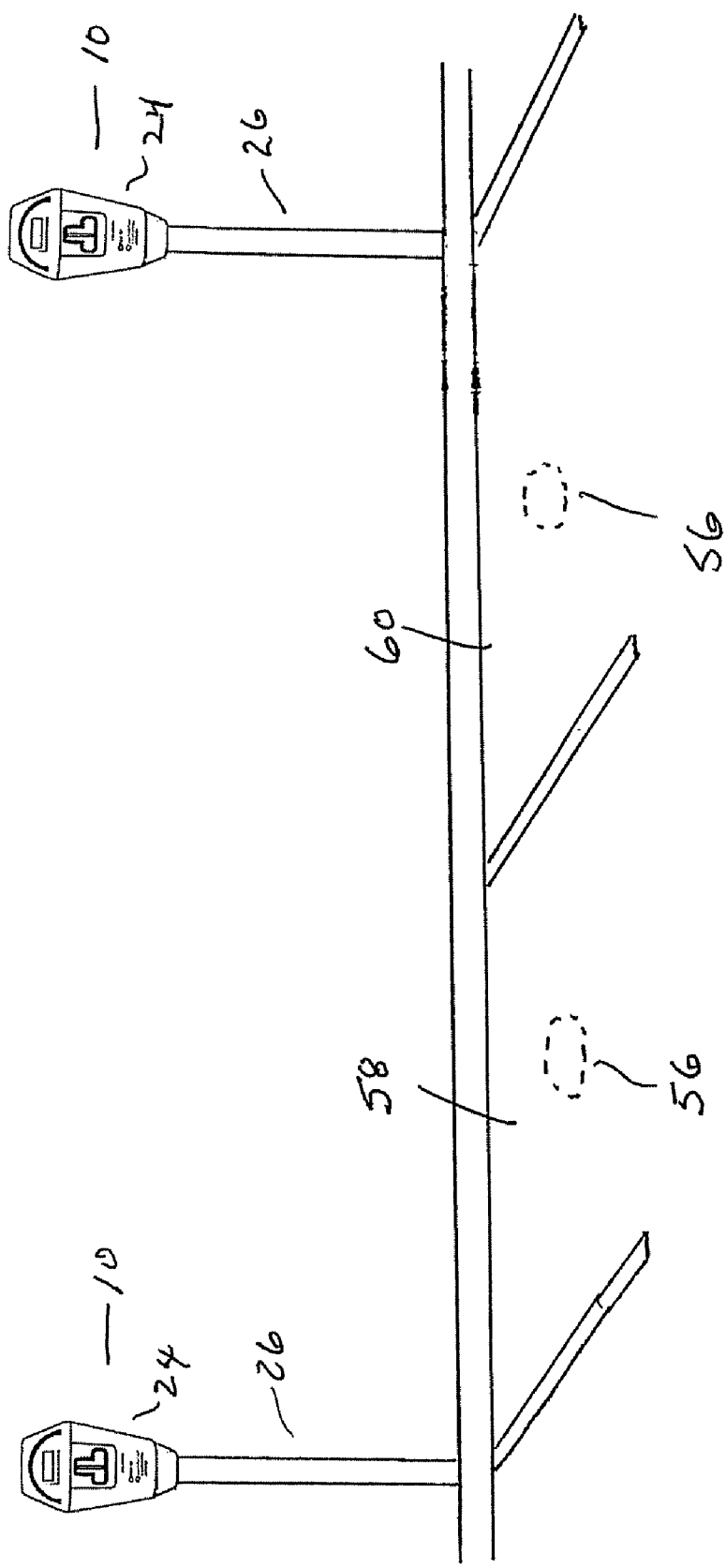
FIG. 5 is a perspective view of parking meters and parking spaces as used in the invention.

Referring to FIG. 5, associated with a pair of parking spaces 58, 60 is a parking meter 10 as described above having a head 24 mounted on pole 26. Parking spaces 58, 60 each have an in-ground vehicle detector 56. In operation, the process is initiated by a vehicle pulling into an associated parking space 58 and its presence being detected by vehicle detector 56 which transmits a signal to meter 10. The microprocessor 44 initiates the timer 46 for a predetermined standby interval upon receiving a signal from vehicle detector 56 that a vehicle is present in associated parking space 58. The driver selects the stall for which payment is to be made by pressing stall selection buttons 36. If payment is to be made by credit card, the driver then swipes the card through credit card reader 38. A fixed amount. e.g. $20 is pre-authorized to the card and the meter begins charging time to the card up to the regulated maximum time permitted for the stall. When the driver returns to leave the stall, he or she swipes the card through credit card reader 38 again and the meter stops the timer, cancels the pre-authorized charge and stores the exact amount of time to be billed to the card. In that way the driver is only charged for the exact amount of time that the vehicle was present in the parking stall. The foregoing is referred to as a "pay-as-you-go" payment. Generally the system will only permit the same credit card that started the parking payment period to end the parking payment period. However the system can also be programmed so that if a second card is swiped for the same stall in respect of which a first card started the payment period, the first card's charges can be put on hold and the second card charged for the subsequent time. Alternatively both cards can be charged, that is, the first card continues to be charged and the second card starts to be charged for the subsequent period. However due to the possibility of tampering by vandals, the preferred method is to only permit the same credit card that started the parking payment period to end the parking payment period, and also provide a maximum charge amount for one parking period (e.g. 8 hours if parking in the space is unlimited).

Rather than have the payment period terminated by a second credit card swipe, the vehicle detector 56 can be used to terminate the payment period. As soon as the vehicle is detected as having left the space, timing of the charges is stopped, the pre-authorized charge is cancelled and the driver's credit card is billed the exact amount of the timing charges.

Alternatively a driver can pre-pay an exact amount of time by following instructions to hold the credit card in the card reader slot 38 while the display increments the time payment amount until the desired prepayment amount is reached. Prepayment using the credit card can also be effected as an alternative by having the driver repeatedly swipe the credit card through credit card reader 38, each swipe adding a paid time increment, until the desired pre-paid time is reached. A button (not shown) can be provided on head 24 to allow the user to select between pre-paid payment or pay-as-you-go payment. The meter 10 will periodically send a wireless message to the system server 16 with the accumulated credit card charge information.

The second payment method uses a wireless smart card. Such smart cards are fitted with radio-frequency chips (RF identification, or RFID, tags) which emit a radio-frequency code when activated by a tag reader and can store and encrypt data. When the card is held within about 10 centimeters of a reader, the wireless transmission sends payment information. For example, the smart card may use wireless chips that conform to the international wireless standard ISO 14443. In operation, the process is initiated by a vehicle pulling into an associated parking space 58 and its presence being detected by vehicle detector 56 which transmits a signal to meter 10. The microprocessor 44 initiates timer 46 for a predetermined standby interval upon receiving a signal from vehicle detector 56 that a vehicle is present in associated parking space 58. The driver selects the stall for which payment is to be made by pressing stall selection buttons 36. If payment is to be made by wireless smart card, the driver holds the card on or adjacent the wireless smart card reader 40 and the meter begins charging time to the card up to the regulated maximum time permitted for the space or stall. When the driver returns to leave the space, he or she holds the card on or adjacent the wireless smart card reader 40 again and the meter stops the timer and deducts payment from the card for the exact amount of time to be billed. In that way the driver is only charged for the exact amount of time that the vehicle was present in the parking stall. The foregoing is referred to as a "pay-as-you-go" payment. Alternatively a driver can pre-pay an exact amount of time by following instructions to hold the smart card on or adjacent the wireless smart card reader 40 while the display increments the time payment amount until the desired prepayment amount is reached, and the reader deducts payment for that amount from the card. Prepayment using the wireless smart card can also be effected as an alternative by having the driver repeatedly hold the smart card on or adjacent the wireless smart card reader 40, each time adding a paid time increment, until the desired pre-paid time is reached, and the amount of each payment being deducted from the card. A button (not shown) can be provided on head 24 to allow the user to select between pre-paid payment or pay-as-you-go payment.

Rather than have the payment period terminated by a second reading of the wireless smart card, the vehicle detector 56 can also be used to terminate the payment period in the pay-as-you-go process for the smart card. When the driver first holds the card on or adjacent the wireless smart card reader 40, a fixed pre-paid amount. e.g. $20 is deducted from the smart card balance and the meter begins timing and calculating the parking charge up to the regulated maximum time permitted for the space or stall. As soon as the vehicle is detected as having left the space, timing of the charges is stopped and the exact amount of the timing charges is calculated. If the amount is less than the pre-paid charge, the difference is credited to the credit balance of the smart card in question by communicating the amount of the credit to the central server 16.

The wireless smart card can be filled or refilled with monetary credit as follows. The user can access an internet web site from terminal 20 and enter the wireless smart card number and a password to check the credit balance and refill the card balance. To refill the smart card, an amount is charged to the user's credit card to be added to the wireless smart card. When the charge has been approved, the user goes to one of the meters 10, holds down a stall selection button 36 for an extended period, say 3 seconds, and then the display 32 instructs the user to hold the smart card on or adjacent the wireless smart card reader 40. The system identifies the card, the meter wirelessly connects in real time to the system server 16 which communicates the amount of the new monetary credit to meter 10 and the tag reader 38 adds the amount of the new credit to the chip on the smart card. Alternatively, the user can in advance register his or her credit card with the system server 16 and refill the smart card at the meter 10. The user goes to one of the meters 10, holds down a stall selection button 36 for an extended period, say 3 seconds, and then the display 32 instructs the user to hold the smart card on or adjacent the wireless smart card reader 40 and enter the amount of the charge to be refilled to the card. The system identifies the card, the meter wirelessly connects in real time to the system server 16 which authorizes the charge to the registered credit card, communicates the amount of the new monetary credit to meter 10 and the tag reader 38 adds the amount of the new credit to the chip on the smart card. Alternatively the system can be authorized by the user to automatically refill the smart card by a pre-selected fixed amount whenever it reaches a zero balance. Prepaid smart cards can also be purchased at participating merchants or other locations managed, for example, by the municipality and the smart cards can also be refilled at such locations.

When a payment has been made for use of associated parking space 58, the microprocessor 44 will receive a signal from payment unit 48, terminate the timing of the standby interval and initiate the timer either for the prepaid parking interval, or for the timing of the pay-as-you-go payment. A parking violation occurs when the operator of the vehicle either fails to make any payment or when the prepaid parking interval expires and the vehicle is still in the space. Upon a parking violation, the violation is signalled by illuminating violation indicators 34. The microprocessor 44 can also activate a digital camera, as can be provided in sensor 56 to take a digital image of the license plate of the vehicle to obtain the license number. If the vehicle is provided with an RFID identification tag, an RFID reader can interrogate the tag, which emits a coded reply signal which communicates a vehicle identification code to the interrogating source which decodes it and either the identification number is stored with the violation information for later processing and/or a call is initiated through a communications modem notifying parking authorities at a monitoring station as to a parking violation and providing the vehicle identification number. In either case a parking ticket is prepared, preferably with the digital image of the vehicle license and mailed to the registered owner of the vehicle.

The present system can also support pay-by-phone payments. Under such system, the user registers with the system by providing a credit card authorization and cellphone number. The user wanting to pay for parking phones into the service, which recognizes the cellphone number and prompts the user to key in a meter number or parking stall number. The system then prompts the user to enter the number of hours to be charged and commences timing and sends a wireless message to meter 10 to display the time which has been pre-paid. Once the time has expired a text message is sent to the user. Alternatively, the user can have the charges running until the user calls back and terminates the parking time charge. Alternatively, the in-ground sensor 56 will sense when the vehicle leaves the stall and cause a communication to be sent to the parking service. In the latter case that will cause the time charges to be terminated and in the former case will avoid the need for the parking service to send the text message to the user.

As a further feature of the system, the information from each meter as to whether its adjacent parking stalls are in use or not is communicated wirelessly to system server 16 which sends the information to electronic billboards 22 which are located at selected intersections and display to drivers the number of parking stalls which are available in that block or area.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method of operating a pay parking system comprising a plurality of parking spaces, a plurality of parking meters, each parking meter comprising a credit card reader, a timer and a processor coupled to said credit card reader, said method comprising:
   a) commencing the timing of a parking payment period by said credit card reader reading a credit card;
   b) authorizing a fixed pre-payment amount to said credit card;
   c) timing the parking period;
   d) ceasing the timing of said parking period upon reading said credit card a second time;
   e) cancelling said fixed pre-payment amount charge;
   f) calculating the charge amount for the time elapsed between steps a) and d);
   g) charging said credit card the amount calculated in step f);

wherein said pay parking system further comprises a plurality of vehicle sensors each associated with one of said parking spaces and adapted to wirelessly communicate with an associated parking meter, said method comprising the further steps of:
   h) upon one of said vehicle sensors sensing the presence of a vehicle in a parking space, starting a pre-payment grace period;
   i) if the pre-payment grace period expires while the vehicle is still in the parking space, indicating a violation;

j) if a credit card is read in respect of the parking space during the pre-payment grace period, commencing the timing of the parking payment period;
k) ceasing the timing of said parking period upon said vehicle sensor sensing that said vehicle has left the parking space;
l) cancelling said fixed pre-payment amount charge;
m) calculating the charge amount for the time elapsed between steps j) and k);
n) charging said credit card the amount calculated in step m).

2. A method of operating a pay parking system comprising a plurality of parking spaces; a plurality of parking meters, each parking meter comprising a smart card reader, wireless communication means for communicating with a central server, a processor coupled to said smart card reader and said wireless communication means, and a timer coupled to said processor; and a plurality of smart cards each comprising data storage means for storing a unique identifier and a variable credit balance, said method comprising:
  a) a user authorizing a credit card payment to said central server in association with a unique identifier of a first smart card;
  b) authorizing a fixed pre-payment amount to said credit card;
  c) said user causing said first smart card to be read at one of said meters;
  d) said meter communicating with said central server;
  e) said central server communicating to said meter the amount of said credit card payment; and
  f) said smart card reader adding the amount of said credit card payment to the credit balance on said first smart card;
wherein said pay parking system further comprises a plurality of vehicle sensors each associated with one of said parking spaces and adapted to wirelessly communicate with an associated parking meter, further comprising the steps of:
  g) upon one of said vehicle sensors sensing the presence of a vehicle in a parking space, starting a pre-payment grace period;
  h) if the pre-payment grace period expires while the vehicle is still in the parking space, indicating a violation;
  i) if a smart card is read in respect of the parking space during the pre-payment grace period, commencing the timing of the parking payment period and charging a fixed pre-payment amount to said smart card;
  j) timing the parking period;
  k) ceasing the timing of said parking period upon said vehicle sensor sensing that said vehicle has left the parking space;
  l) calculating the charge amount for the time elapsed between steps i) and k);
  m) if the charge calculated in step l) is less than the pre-payment amount charged in step i) then communicating a credit in the amount of the difference between the pre-payment amount charged in step i) and the charge calculated in step l) to said central server in association with the unique identifier of said smart card; and
  n) said central server crediting the credit balance of said smart card the amount of said communicated credit.

3. A pay parking system for controlling a plurality of parking spaces, comprising:
  a) a plurality of parking meters, each parking meter comprising a credit card reader, a timer and a processor coupled to said credit card reader;
  b) means provided in said processor for
    i) commencing the timing of a parking payment period by said credit card reader reading a credit card;
    ii) authorizing a fixed pre-payment amount to said credit card;
    iii) timing the parking period;
    iv) ceasing the timing of said parking period upon reading said credit card a second time;
    v) cancelling said fixed pre-payment amount charge;
    vi) calculating the charge amount for the time elapsed between steps I) and iv);
    vii) charging said credit card the amount calculated in vi);
  and further comprising:
  c) a plurality of vehicle detection means each associated with one of said parking spaces for detecting the presence or absence of a vehicle in said one of said parking spaces, and comprising means for communicating a signal indicative of the presence or absence of a vehicle in said one of said parking spaces to the parking meter associated with said one of said parking spaces.

4. The pay parking system as defined in claim 3 wherein the processor initiates the timer for a predetermined standby interval upon receiving a signal from the vehicle detection means that a vehicle is present in the associated parking space, wherein said processor is adapted to terminate the timing of the standby interval upon receiving a signal from the credit card reader.

* * * * *